MULTIPLEX STEREOPHONIC TRANSMITTING AND RECEIVING SYSTEM

Filed July 12, 1961

INVENTORS
HAROLD B. COLLINS, JR.
DONALD E. MARSHALL, JR.
BY
Robert D. Sanborn
ATTORNEY INVENTORS
HAROLD B. COLLINS, JR.
DONALD E. MARSHALL, JR.
BY
Robert D. Sanborn
ATTORNEY United States Patent Office 3,069,505

Patented Dec. 18, 1962

3,069,505

MULTIPLEX STEREOPHONIC TRANSMITTING AND RECEIVING SYSTEM

Harold B. Collins, Jr., Wayne, and Donald E. Marshall, Jr., Bryn Mawr, Pa., assignors, by mesne assignments, to Philco Corporation, Philadelphia, Pa., a corporation of Delaware Filed July 12, 1961, Ser. No. 123,589
11 Claims. (Cl. 179—15)

The present invention relates to means for accomplishing the transmission and reception of stereophonically related program signals and more particularly to means for transmitting and receiving two stereophonically related program signals over a signal frequency modulation channel in a manner which permits both the reception of the stereophonically related transmitted signal by a monaural receiver and the reception of monaural program signals by the stereophonic receiver.

Compatibility between sterephonic signal transmission and existing monaural receivers is achieved by transmitting over a single channel signals representative of the sum and difference of the original stereophonically related program signals rather than the original programs themselves. The transmitted signal is so constituted that a monoaural receiver responds to the sum signal but will not respond to the difference signal. Sterephonic receivers respond to both the sum and difference signals and matrix these signals to recover the original stereophonically related program signals. Various systems have been proposed for transmitting the sum and difference signals over a single frequency modulation channel but such systems are subject to disadvantages such as phase distortions due to unequal phase delays imposed by dissimilar filters or the like in the sum and difference channels, or the need for relatively complex circuitry to generate a composite compatible signal suitable for transmission over a single channel. At the receiving end of the system the stereophonic receiver should be capable of receiving both stereophonic and monaural signals. Since transmission stations may, at times, transmit signals containing stereophonic program information and at other times may transmit only monaural program information, the stereophonic receiver should be capable of receiving both types of signals interchangeably without readjustment of the receiver controls or intervention on the part of the listener. While receivers have been proposed which are said to accomplish this objective, we have discovered that such receivers may be subject to excessive noise level during reception of monaural program information. This may be due in part to differences between the overall bandwidth of the monaural program information and the stereophonic sum signal as well as for other causes.

Therefore it is an object of the present invention to provide a system for transmitting two stereophonically related program signals over a single FM channel in a manner compatible with existing monaural receivers.

Still another object of the present invention is to provide a system for transmitting two stereophonically related program signals over a single frequency modulation channel in a manner such as to maximize the ratio of program signal bandwidth to radio frequency signal bandwidth.

An additional object of the present invention is to provide a novel, compatible stereophonic transmitter which has inherently similar phase delays in the sum and difference channels.

A further object of the present invention is to provide a novel receiver circuit which will receive interchangeably either monaural program information or stereophonic program information.

A more specific object of the present invention is to provide a stereophonic receiver with means for disabling at least a portion of the difference channel during the reception of monaural program information.

In general, these and other objects of the present invention are achieved by combining the two stereophonic program signals to produce sum and difference signals, amplitude modulating the difference signal on a subcarrier, suppressing the subcarrier, combining the remaining sidebands of the subcarrier with the sum signal and then frequency modulating a radio frequency carrier wave with the combined signal. At the receiver, discriminator means are employed to recover a signal corresponding to the composite modulating signal. Suitable filter means separate sum portion from the sidebands representing the difference information. The separated sidebands are synchronously detected and the detected signals, after proper filtering, are matrixed with the sum signal to recover signals representative of the original stereophonically related program signals. Means responsive to signals in a selected portion of the spectrum occupied by the difference sidebands are provided for disabling the synchronous detector in the absence of any difference sideband information.

For a better understanding of the present invention together with other and further objects thereof, reference should now be made to the following detailed description which is to be read in conjunction with the accompanying drawings in which.

Figure 1:
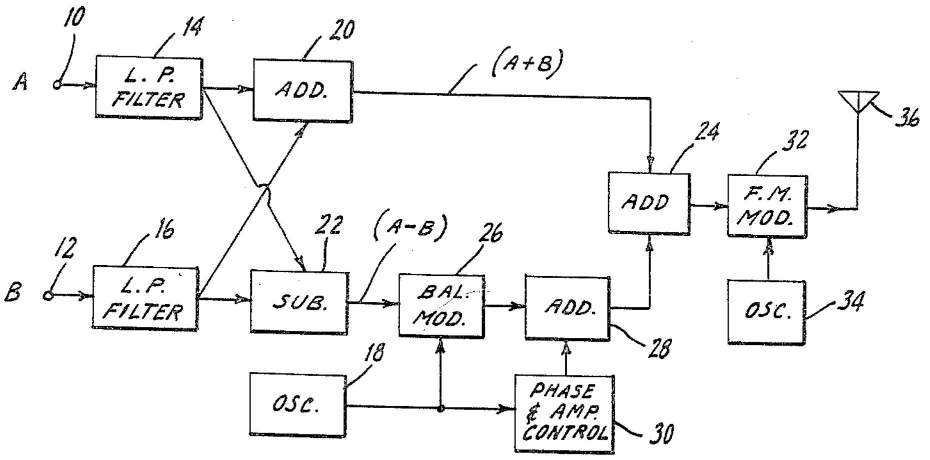
FIG. 1 is a block diagram of a transmitter arranged in accordance with the present invention.

The transmitter of FIG. 1 comprises input terminals 10 and 12 to which may be connected two stereophonic program signal sources represented schematically by the letters A and B, respectively. Inputs 10 and 12 connect to two identical low pass filters 14 and 16. For reasons which will become clear presently, filters 14 and 16 have an upper cutoff frequency equal to or slightly less than one half the frequency of the signal supplied by subcarrier oscillator 18. The outputs of low pass filters 14 and 16 are coupled to an adder circuit 20 and to a subtractor circuit 22. The output of adder circuit 20 is connected directly to one input of a second adder circuit 24. The output of subtractor circuit 22 is coupled to a second input of adder circuit 24 by way of balanced modulator 26 and a third adder circuit 28. Modulator 26 receives a second input from oscillator 18. The output of oscillator 18 is also coupled to a second input of adder circuit 28 by way of a phase and amplitude control circuit 30. The output of adder circuit 24 is supplied to the modulating signal input of a frequency modulator 32. Modulator 32 receives a carrier wave from oscillator 34 and supplies a frequency modulated carrier wave to system antenna 36.

The operation of adder circuit 20 is, of course, well understood. It produces the stereophonic sum signal $(A+B)$. Similarly, subtractor circuit 22 produces the stereophonic difference signal $(A-B)$. The stereophonic sum and difference signals have an upper frequency range which corresponds to the cutoff frequency of filters 14 and 16, respectively. Modulator 26 is balanced for audio frequency signals so that the output of modulator 26 is a subcarrier at the frequency of the signal supplied by oscillator 18 with sidebands corresponding to the difference signal $(A-B)$. In a system for the stereophonic transmission of the audio portion of a television program oscillator 18 may be a circuit which supplies a signal at the horizontal line frequency of the video portion of the television program. As will be seen presently this facilitates reinsertion of the subcarrier at the receiver. Phase and amplitude control circuit 30 supplies to adder circuit 28 a signal which is equal in amplitude but opposite in phase to the subcarrier component at the output of modulator 26. Thus the signal at the output of adder circuit 28 comprises a double sideband, suppressed carrier signal representative of the stereophonic difference information. Suppression of the carrier reduces the amplitude of certain of the sideband components of the frequency modulated transmitted signal.

Figure 2:
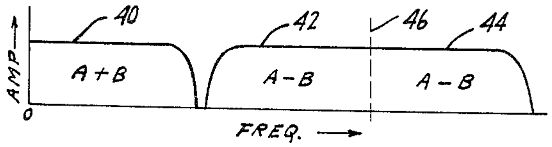
FIG. 2 is a frequency versus amplitude plot which is illustrative of the operation of the circuit of FIG. 1.

The sum signal at the output of adder circuit 20 is shown at 40 in FIG. 2. Curves 42 and 44 represent the lower and upper sidebands, respectively, of the difference signal at the output of adder 28. The broken line 46 represents the location of the subcarrier wave which is suppressed by phase and amplitude control circuit 30 and adder circuit 28. The entire signal represented by FIG. 2 is supplied to modulator 32 to frequency modulate the carrier wave supplied by oscillator 34. The use of adder circuit 28 and phase control circuit 30 to balance out the subcarrier wave has the advantage that no subcarrier filter is required in the difference channel. Such a filter would produce frequency dependent phase delays different from those introduced in the sum channel. The compensation for the relatively constant time delays introduced by modulators 26 and adder circuit 28 may be provided in the connection between adder circuit 20 and adder circuit 24.

Figure 3:
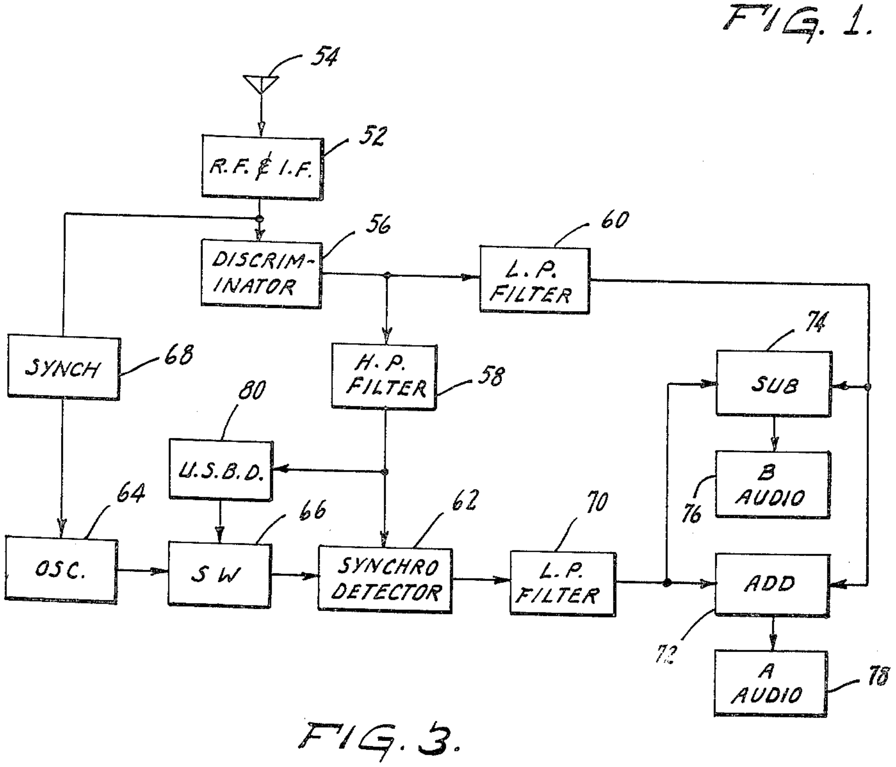
FIG. 3 is a block diagram of a receiver organized in accordance with the present invention.

The receiver portion of the invention shown in FIG. 3 comprises an input portion 52 which may include the usual radio frequency stages, heterodyne converter and intermediate frequency amplifier stages. The portion 52 receives input signals from the system antenna 54. The frequency modulated intermediate frequency signal from portion 52 is supplied to a discriminator circuit 56. The output signal of the discriminator 56 is supplied to a high pass filter 58 and a low pass filter 60.

The output of high pass filter 58 is connected to one input of a synchronous detector 62. A demodulating oscillator 64 is connected to a second input of synchronous detector 62 by way of a switch 66. Synchronizing means 68 is coupled to the output of receiver portion 52 and to oscillator 64 for maintaining the signal supplied by oscillator 64 at the frequency and phase to represent the subcarrier component of the signal at the output of high pass filter 58.

The output of synchronous detector 62 is supplied by way of a low pass filter 70 to one input of an adder circuit 72 and one input of a subtractor circuit 74. A second input to adder 72 and a second input to subtractor 74 are coupled to the output of filter 60.

The output of subtractor 74 is coupled to one audio frequency amplifier and transducer circuit represented schematically by block 76 and the output of adder 72 is coupled to a second audio frequency amplifier and transducer circuit 78.

Figure 4:
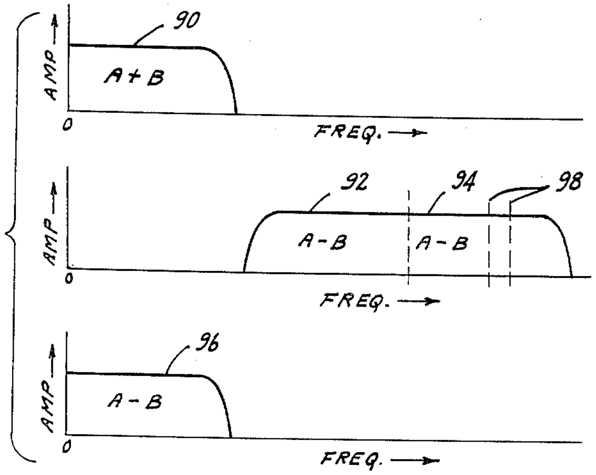
FIGS. 4 and 5 are amplitude versus frequency plots which are illustrative of the operation of the receiver of FIG. 3.

The output of high pass filter 58 is also coupled to an upper sideband detector circuit 80 which may comprise a narrow band filter followed by a diode detector circuit. The filter should have a passband at a selected point within the frequency range occupied by the upper sideband of the difference signal. A suitable frequency range is represented by lines 98 of FIG. 4. The output of the upper sideband detector 80 is coupled to switch 66 to control the operation of this switch.

The receiver circuit of FIG. 3 operates in the following manner. If a stereophonic program signal is being received, the output of discriminator 56 has a frequency spectrum similar to that shown in FIG. 2. The sum signal $(A+B)$ is passed by low pass filter 60 as shown at 90 in FIG. 4. However the sideband signals 42 and 44 of FIG. 2 are blocked by filter 60. High pass filter 58 passes the sidebands 42 and 44 as shown at 92 and 94 in FIG. 4. However the sum signal is not passed by a filter 58. Since a signal is present within the passband of the upper sideband detector 80, a signal will be supplied to switch 66. This signal will cause switch 66 to maintain a signal path from oscillator 64 to synchronous detector 62. The output of synchronous detector 62 is the difference signal 96 in FIG. 4. The signals represented by plots 90 and 96 are matrixed in adder 72 and subtracter 74 to produce the A and B program signals, respectively, which are supplied to audio circuits 78 and 76.

If the circuit shown in FIG. 3 comprises the sound channel of a television receiver, a signal at the horizontal synchronizing frequency may be supplied by the input section 52 to oscillator 64 my way of synchronizing circuit 68. Synchronizing circuit 68 may, in this instance, take the form of a simple phase control circuit. If the system of FIGS. 1 and 3 is a frequency modulation transmitter and no subcarrier is transmitted, the appropriate subcarrier may be regenerated in the input circuit 52 of FIG. 3 by beating together the upper and lower sidebands representing the difference signal. While it is assumed that the regeneration of the demodulating reference signal takes place in input circuit 52, some economy of circuit components may be realized by beating together the sidebands representing the difference signal which are represented at the output of high pass filter 58.

Figure 5:
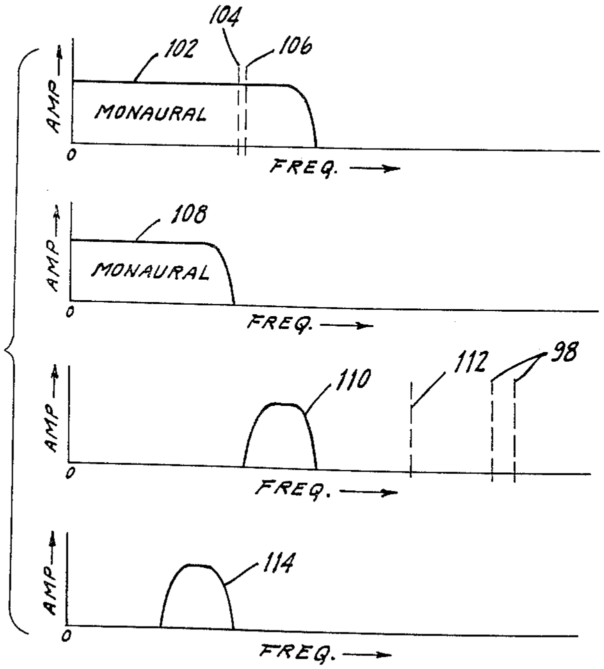

FIG. 5 illustrates the operation of the circuit of FIG. 3 in response to a monaural program signal having frequency components higher than the cutoff frequency of filter 60. The monaural program signal is represented by curve 102 in FIG. 5. The broken line 104 represents the cutoff frequency of low pass filter 60 and broken line 106 represents the cutoff frequency of high pass filter 58. Curve 108 in FIG. 2 represents the signal passed by low pass filter 60 to the inputs of subtracter 74 and adder 72. Curve 110 represents the portion of the monaural signal passed by high pass filter 58. The signals represented by curve 110 are the high frequency components of the monaural signal lying, for example, between 7½ kilocycles and 10 kilocycles. Of course, no subcarrier wave will be present with the monaural signal. However the frequency of the stereophonic subcarrier has been indicated by a line 112 for reference. Also the passband 98 of the upper sideband detector 80 is shown for reference. If oscillator 64 should supply a demodulating signal to synchronous detector 62 at the frequency represented by broken line 112, the high frequency components of the monaural signal which pass high pass filter 58 would be heterodyned to a lower audio frequency as represented by the curve 114. These components represented by curve 114 would be passed by low pass filter 70 to the inputs of subtracter 74 and adder 72. The signals represented by curve 114 would appear as noise signals at the outputs of audio devices 76 and 78 since they are high frequency components of the monaural signal heterodyned to a lower audio frequency.

The circuit of FIG. 3 suppresses components represented by the curve 114 by means of switch 66 and upper sideband detector 80. As shown in FIG. 5, there is no signal present within the passband 98 of upper sideband detector 80. Therefore detector 80 will cause switch 66 to be open circuited and thus prevent the passage of a demodulating signal from oscillator 64 to synchronous detector 62. Since no demodulating signal is present, signals represented by curve 110 will not be heterodyned to a lower frequency. Any signals at the frequency represented by curve 110 which might pass through detector 62 will be blocked by low pass filter 70. Therefore the circuit of FIG. 3 will reproduce all of the components of the monaural signal up to the cutoff frequency 104 of low pass filter 60 without distortion and will not be adversely affected by any components of the monaural signal which lie above the cutoff frequency of high pass filter 58.

While there has been described what is at present considered to be the preferred embodiment of the invention, it will be apparent that various modifications and other embodiments thereof will occur to those skilled in the art within the scope of the invention. Accordingly we desire the scope of our invention to be limited only by the appended claims.

We claim:

1. A system for the stereophonic transmission of two program signals comprising first adder means, means for supplying said two program signals to said first adder means, subtracter means, means for supplying said two program signals to said subtracter means, a balanced modulator coupled to the output of said subtracter means, a subcarrier wave source coupled to said balanced modulator for supplying a subcarrier wave thereto, second adder means having one input thereof coupled to the output of said balanced modulator, phase and amplitude control means coupling said subcarrier wave source to a second input of said second adder means, third adder means coupled to the outputs of said first and second adder means, frequency modulating means coupled to the output of said third adder means and means for supplying a carrier wave to be modulated to said frequency modulating means.

2. A system in accordance with claim 1 wherein said means for supplying said two program signals to said first adder means and to said subtracter means comprise low pass filter means having cutoff frequencies not greater than one half the frequency of said subcarrier wave.

3. A system in accordance with claim 1 wherein said means for supplying said two program signals to said first adder means and to said subtracter means comprises low pass filter means having cutoff frequencies approximately equal to and not greater than one half the frequency of said subcarrier wave.

4. A system for receiving a carrier wave modulated by a signal in a first frequency band which is representative of the sum of two stereophonic program signals and a signal in an adjacent frequency band which comprises the upper and lower amplitude modulation sidebands of a subcarrier representative of the difference of said two stereophonic program signals, said system comprising demodulating means for demodulating said carrier wave to recover the modulation component thereof, signal processing means for deriving a signal at the frequency of said subcarrier wave from said modulated carrier wave, signal adder means, signal subtracter means, first low pass filter means coupling the output of said demodulating means to one input of said signal adder means and one input of said signal subtracter means, synchronous detector means, additional filter means having a passband which lies substantially entirely outside the passband of said first low pass filter means, said additional filter means coupling said demodulating means to one input of said synchronous detector means, means coupling the output of said signal processing means to a second input of said synchronous detector means, and second low pass filter means coupling the output of said synchronous detector to a second input of said signal subtracter means and a second input of said signal adder means.

5. A system for receiving a carrier wave modulated by a signal in a first frequency band which is representative of the sum of two stereophonically related program signals and a signal in an adjacent frequency band which comprises the upper and lower amplitude modulation sidebands of a subcarrier wave, said sidebands being representative of the difference of said two stereophonically related program signals, said system comprising demodulating means for demodulating said carrier wave to recover the modulation component thereof, signal processing means for deriving a signal at the frequency of said subcarrier wave from said modulated carrier wave, signal adder means, signal subtracter means, first low pass filter means coupling the output of said demodulating means to one input of said signal adder means and to one input of said signal subtracter means, synchronous detector means, additional filter means having a lower cutoff frequency at least as high as the upper cutoff frequency of said first low pass filter means, said additional filter means coupling said demodulating means to one input of said synchronous detector means, signal controlled coupling means coupling the output of said signal processing means to a second input of said synchronous detector means, means coupled to the output of said additional filter means for detecting the presence of a signal in a selected frequency band displaced from said lower cutoff frequency of said additional filter means, means coupling said lastmentioned means to said signal controlled coupling means for determining coupling afforded thereby, and second low pass filter means coupling the output of said synchronous detector means to a second input of said signal subtracter means and to a second input of said signal adder means.

6. A system for receiving a carrier wave modulated by a signal in a first frequency band which is representative of the sum of two stereophonically related program signals and a signal in an adjacent frequency band comprising the upper and lower sidebands of a subcarrier wave, said upper and lower sidebands being representative of the difference of said two stereophonically related program signals, said system comprising demodulator means for demodulating said carrier wave to recover the modulation component thereof, signal processing means for deriving a signal at the frequency of said subcarrier wave from said modulated carrier wave, signal adder means, signal subtracter means, first low pass filter means coupling the output of said demodulating means to one input of said signal adder means and to one input of said signal subtracter means, synchronous detector means, additional filter means having a lower cutoff frequency at least as high as the upper cutoff frequency of said first low pass filter means, said additional filter means coupling said demodulating means to one input of said synchronous detector means, signal controlled coupling means coupling the output of said signal processing means to a second input of said synchronous detector means, means coupled to the output of said additional filter means for detecting the presence of a signal in a selected frequency range of the upper sideband region of the signal at the output of said additional filter means, means responsive to said lastmentioned means for controlling said signal controlled coupling means to provide coupling between said signal processing means and said signal detector means only upon the presence of a signal in said selected frequency range, and second low pass filter means coupling the output of said synchronous detector means to a second input of said signal subtracter means and to a second input of said signal adder means.

7. A system in accordance with claim 6 wherein said first and second low pass filter means have substantially identical frequency passband characteristics.

8. A system in accordance with claim 6 wherein the passbands of said first and second low pass filters correspond substantially to said first frequency band and wherein the frequency of said subcarrier wave is approximately twice the upper cutoff frequency of said first low pass filter means.

9. A system for the stereophonic transmission and reception of two program signals comprising a transmitter including a first adder means, means for supplying said two program signals to said first adder means, a subtracter means, means for supplying said two program signals to said subtracter means, an amplitude modulator coupled to the output of said subtracter means, a subcarrier wave source coupled to said amplitude modulator for supplying a subcarrier wave thereto, second adder means having one input coupled to the output of said first adder means, means coupling said amplitude modulator to a second input of said second adder means, frequency modulating means coupled to the output of said second adder means and means for supplying a carrier wave to be modulated to said frequency modulating means, said system further comprising a receiver portion including demodulating means for demodulating said carrier wave to recover the modulation component of said carrier wave, signal processing means for deriving a signal at the frequency of said subcarrier wave from said modulated carrier wave, third adder means, second subtracter means, low pass filter means coupling the output of said demodulating means to one input of said third adder means and one input of said second subtracter means, synchronous detector means, additional filter means coupling said demodulating means to one input of said synchronous detector means, said additional filter means having a lower cutoff frequency which is at least as high as the upper cutoff frequency of said low pass filter means, means coupling the output of said signal processing means to a second input of said synchronous detector means and second low pass filter means coupling the output of said synchronous detector means to a second input of said second subtracter means and a second input of said third adder means.

10. A system in accordance with claim 9 said system further comprising means coupled to the output of said additional filter means for detecting the presence of a signal corresponding to at least a portion of the upper sideband of said subcarrier wave, said lastmentioned means being coupled to said means coupling said signal processing means to said synchronous detector means for blocking the transfer of a signal from said signal processing means to said signal detector means in the absence of a signal corresponding to at least a portion of said upper sideband of said subcarrier wave.

11. A system in accordance with claim 9 said system further comprising means for suppressing said subcarrier wave at said transmitter.

No references cited.